US011375225B1

(12) United States Patent
Kohn et al.

(10) Patent No.: US 11,375,225 B1
(45) Date of Patent: *Jun. 28, 2022

(54) INTERLEAVED VIDEO CODING PIPELINE

(71) Applicant: Ambarella International LP, Santa Clara, CA (US)

(72) Inventors: Leslie D. Kohn, Saratoga, CA (US); Ellen M. Lee, Saratoga, CA (US); Peter Verplaetse, Redwood City, CA (US)

(73) Assignee: Ambarella International LP, Santa Clara, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 15/883,262

(22) Filed: Jan. 30, 2018

Related U.S. Application Data

(63) Continuation of application No. 13/935,424, filed on Jul. 3, 2013, now Pat. No. 9,924,165.

(51) Int. Cl.
*H04N 19/436* (2014.01)
*H04N 19/50* (2014.01)

(52) U.S. Cl.
CPC .................... *H04N 19/50* (2014.11)

(58) Field of Classification Search
CPC ..... H04N 19/156; H04N 19/43; H04N 19/436
USPC .................................................... 375/240.01
See application file for complete search history.

(56) References Cited

U.S. PATENT DOCUMENTS

| | | | |
|---|---|---|---|
| 7,095,783 B1 | 8/2006 | Sotheran | 375/240.01 |
| 7,634,776 B2 * | 12/2009 | Parameswaran | G06F 15/7842 345/506 |
| 8,098,733 B2 | 1/2012 | Veremeev | 375/240.01 |
| 9,055,306 B2 | 6/2015 | Lyashevsky | |
| 2002/0101930 A1 | 8/2002 | Wang | 375/240.23 |
| 2006/0239343 A1* | 10/2006 | Mohsenian | H04N 19/196 375/240.01 |
| 2007/0204137 A1 | 8/2007 | Tran | 712/214 |
| 2008/0240254 A1* | 10/2008 | Au | G06T 1/20 375/240.24 |
| 2009/0046776 A1 | 2/2009 | Au | 375/240.01 |
| 2009/0310685 A1 | 12/2009 | Schmidt | 375/240.24 |
| 2012/0120256 A1* | 5/2012 | Hwang | G06T 1/20 348/207.1 |

(Continued)

FOREIGN PATENT DOCUMENTS

| | | | | |
|---|---|---|---|---|
| DE | WO2013107906 A2 | | 7/2013 | H04N 19/19 |
| WO | WO2013107906 A2 * | | 7/2013 | H04N 19/91 |

*Primary Examiner* — James T Boylan

(74) *Attorney, Agent, or Firm* — Christopher P. Maiorana, PC

(57) ABSTRACT

An apparatus includes a memory and a hardware pipeline. The memory may be configured to store video data. The video data includes a plurality of sections of one or more pictures that may be processed independently. The hardware pipeline comprises a plurality of pipeline stages implementing a video coding process comprising a number of steps. Each of the plurality of pipeline stages performs an associated task of a different step of the video coding process in a substantially similar time on a different one of the plurality of sections as each of the plurality of sections pass through each of the pipeline stages. At least one of the plurality of pipeline stages communicates predictor information that is based on actual neighbor data to an earlier stage of the hardware pipeline.

18 Claims, 6 Drawing Sheets

(56) References Cited

U.S. PATENT DOCUMENTS

| | | | |
|---|---|---|---|
| 2012/0183052 A1 | 7/2012 | Lou | 375/240.03 |
| 2013/0101029 A1* | 4/2013 | Srinivasan | H04N 19/11 |
| | | | 375/240.12 |
| 2013/0155082 A1* | 6/2013 | Lecellier | G06T 1/20 |
| | | | 345/522 |
| 2013/0301712 A1* | 11/2013 | Hsieh | H04N 19/129 |
| | | | 375/240.08 |
| 2014/0072040 A1* | 3/2014 | Mathew | H04N 19/176 |
| | | | 375/240.13 |
| 2014/0254666 A1 | 9/2014 | Rapaka | 375/240.12 |
| 2014/0334545 A1 | 11/2014 | Schmit | 375/240.15 |
| 2015/0084969 A1 | 3/2015 | Okruhlica | 345/506 |

* cited by examiner

INTERLEAVED VIDEO CODING PIPELINE

This application relates to U.S. Ser. No. 13/935,424, filed Jul. 3, 2013, which is incorporated by reference in its entirety.

FIELD OF THE INVENTION

The present invention relates to video compression generally and, more particularly, to an interleaved video coding pipeline.

BACKGROUND OF THE INVENTION

Video compression standards provide several mechanisms, such as slicing and tiling, to divide a picture into several sections that can be processed independently. The picture sections are further divided into smaller blocks that are processed sequentially to achieve a good ratio of video quality to compressed size. Processing of the smaller blocks involves block-level decisions. For high-quality video coding systems, the block-level decision process typically has several steps, including loading of reference samples, motion estimation, cost calculation of various prediction candidates and final calculation of the block using a selected candidate.

The performance of processing a section of the picture is limited due to the sequential nature of the video coding process. A known technique to work around the sequential nature of the coding process is to use estimated neighbor information to construct predictors. The use of estimated neighbor information to construct predictors allows hardware to be pipelined, but comes at a cost of significantly lower video coding quality. Performance can be increased without loss of quality by processing multiple sections of the picture in parallel. Typical multi-core solutions provide the above performance increase at the cost of a significant increase of the hardware area. The increase in area grows linearly with the increase in performance.

It would be desirable to implement an interleaved video coding pipeline.

SUMMARY OF THE INVENTION

The present invention concerns an apparatus including a memory and a hardware pipeline. The memory may be configured to store video data. The video data includes a plurality of sections of one or more pictures that may be processed independently. The hardware pipeline comprises a plurality of pipeline stages implementing a video coding process comprising a number of steps. Each of the plurality of pipeline stages performs an associated task of a different step of the video coding process in a substantially similar time on a different one of the plurality of sections as each of the plurality of sections pass through each of the pipeline stages. At least one of the plurality of pipeline stages communicates predictor information that is based on actual neighbor data to an earlier stage of the hardware pipeline.

The objects, features and advantages of the present invention include providing an interleaved video coding pipeline that may (i) achieve high performance, high quality video coding with a minimum hardware area, (ii) implement each step in a video coding decision process with different hardware units, (iii) process multiple areas of a picture in parallel, (iv) use predictor information that is based on actual neighbor data rather than based on estimated neighbor data, and/or (v) achieve higher performance without significant increase in total hardware area.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embodiments of the invention achieve high performance, high quality video coding with minimum hardware area. High quality video coding generally involves multiple steps in a decision process. Each step of the decision process can be implemented with separate hardware units. By processing multiple areas of a picture in parallel and in an interleaved fashion, significantly higher performance can be achieved without significantly increasing the total area of the hardware units.

Figure 1:
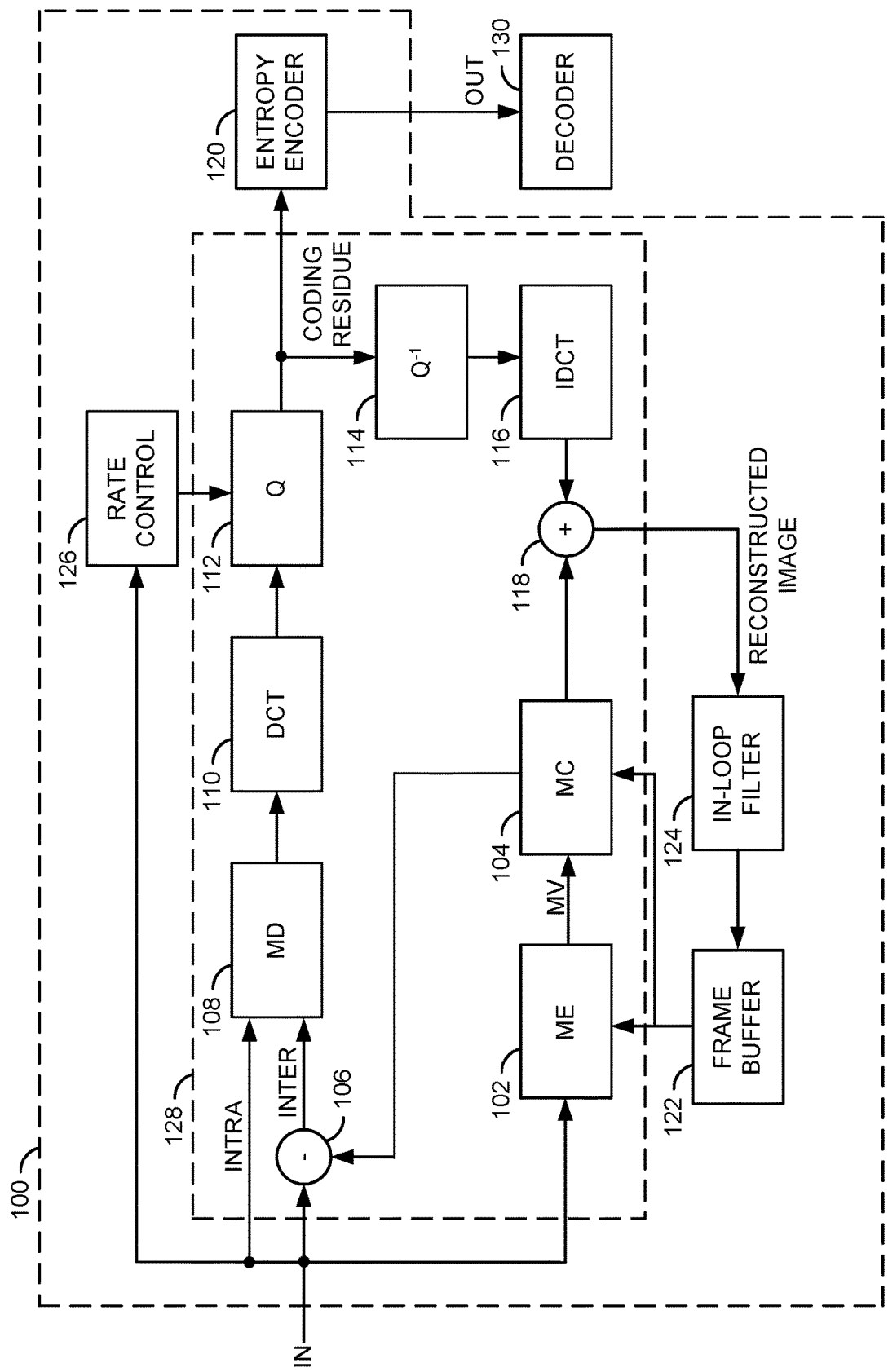
FIG. 1 is a functional block diagram illustrating an example of a video encoding system including a hardware pipeline in accordance with an embodiment of the present invention.

Referring to FIG. 1, a functional block diagram of a system 100 is shown illustrating a hardware implemented video coding pipeline in accordance with an embodiment of the present invention. The system (or apparatus) 100 may be referred to as a video encoder (or encoding) system. The system 100 is generally operational to encode video sequences received in an input signal (e.g., IN) to generate a standard-compliant bitstream (e.g., a signal OUT). The signal IN may be compliant with a Consultative Committee for International Radio (CCIR) standard CCIR-601, a CCIR-656 standard, an RGB video input standard or the like. The bitstream OUT may be compliant with compression standards such as ISO MPEG-1/2/4, the ITU H.26x standards, High Efficiency Video Coding (HEVC), or the like. The encoding functions (or tasks) performed by the system 100 may be mapped to a number of stages. The stages are generally implemented with separate dedicated hardware units arranged as a hardware pipeline.

In some embodiments, the encoding functions performed by the system 100 comprise a motion estimation (ME) module (or operation) 102, a motion compensation (MC)

module (or operation) 104, a difference module (or operation) 106, a mode decision module (or operation) 108, a discrete cosine transform (DCT) module (or operation) 110, a quantization (Q) module (or operation) 112, an inverse quantization ($Q^{-1}$) module (or operation) 114, an inverse DCT module (or operation) 116, a summation module (or operation) 118, an entropy encoder module (or operation) 120, a frame buffer (memory) module (or operation) 122, an optional filter module (or operation) 124, and an optional rate control module (or operation) 126. The operations performed by the modules 102-126 generally implement encoding steps typical of the particular compression scheme(s) supported by the system 100. The modules 102-118 are implemented as a number (e.g., N) of hardware stages, which are configured to operate in a pipeline fashion. Pictures (e.g., tiles, slices, fields and/or frames) received in the signal IN may be encoded using either intra-coding or inter-coding. A decoder 130 may be used to recover the pictures from the encoded bitstream OUT. The modules 102-126 may be implemented in hardware and/or software executing on one or more processors.

In various embodiments, the ME module 102 may be operational to compute motion vectors (e.g., MV) in an integer resolution and/or a sub-pel resolution. The MC module 104 may be operational to reconstruct the original pictures from encoded representations of the pictures. The MD module 108 may be operational to compute both intra-coding costs and inter-coding costs, with, for example, the lower of the costs being used. The motion estimation module 102, the motion compensation module 104 and the mode decision module 108 may consume about 50-90% of the total encoder operations.

Figure 2:
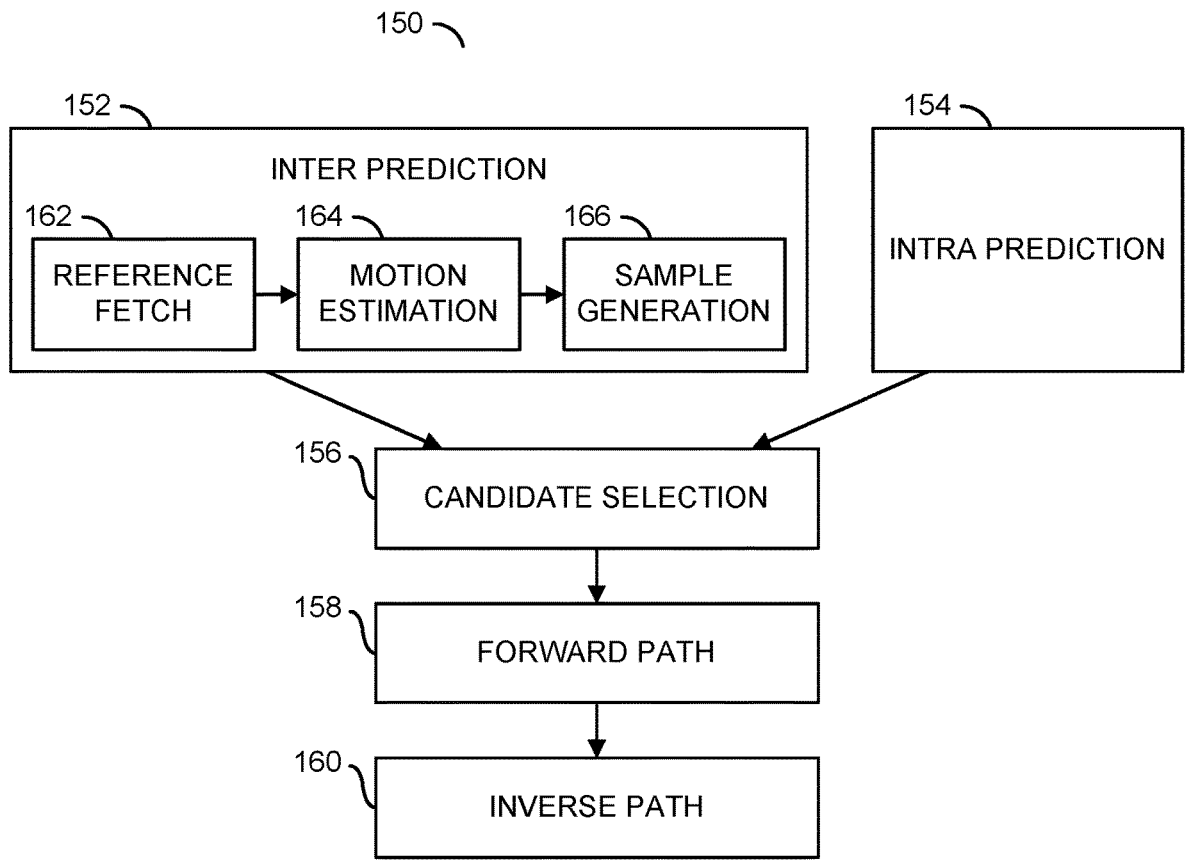
FIG. 2 is a diagram illustrating example tasks involved in a video encoding process.

Referring to FIG. 2, a block diagram is shown illustrating a number of example blocks for performing the tasks of a typical video coding system. In one example, the system 100 may comprise blocks performing (i) an inter prediction task 152, (ii) an intra prediction task 154, (iii) a candidate selection task 156, (iv) a forward path task 158, and (v) an inverse path task 160. The inter prediction task 152 generates prediction samples (e.g., by interpolation or extrapolation) from temporally neighboring samples. The intra prediction task 154 generates prediction samples by extrapolation from spatially neighboring samples. The candidate selection task 156 selects a winner from various candidates. In one example, the candidate selection task 156 uses a cost metric such as SATD (Sum of Absolute Transformed Differences). The forward path task 158 performs forward transform and quantization of the residual samples for each remaining candidate. The inverse path task 210 performs inverse quantization and transform to generate the reconstructed samples. The reconstructed samples can be used to generate inter and intra prediction samples for temporally and spatially neighboring blocks.

The inter prediction task 152 may be further subdivided into a reference fetch task 162, a motion estimation task 164, and inter prediction sample generation task 166. The reference fetch task 162 fetches a region of samples from each potential reference picture. The motion estimation task 164 finds the best motion vector for each potential reference picture using, for example, a simple cost metric such as SAD (Sum of Absolute Differences). The inter prediction sample generation task 166 generates an (weighted) average of prediction samples from a motion compensated forward and/or backward reference picture.

In various embodiments, the tasks 152-160 are generally grouped into a number (e.g., N) of stages. Special care needs to be taken to specifically group the tasks such that each stage can efficiently be implemented in hardware in a way that the associated task or tasks of each stage can be completed in a substantially similar amount of time. The grouping of the tasks generally forms the basis of the hardware pipeline in accordance with embodiments of the present invention. The grouping by itself does not deliver any increase in performance, because of data dependencies between neighboring blocks. For any particular block in the picture, execution of the tasks in the first stage cannot be started until the last stage has been completed for the left neighboring block.

In various embodiments, the data dependencies between neighboring blocks are broken by processing N pictures in the N stages in an interleaved fashion. The N pictures can be N independent video sequences, or N sections of the same picture of a single video sequence, or any combination thereof. By breaking the data dependencies, an N times performance improvement may be achieved by using the hardware units in a pipelined fashion.

Figure 3:
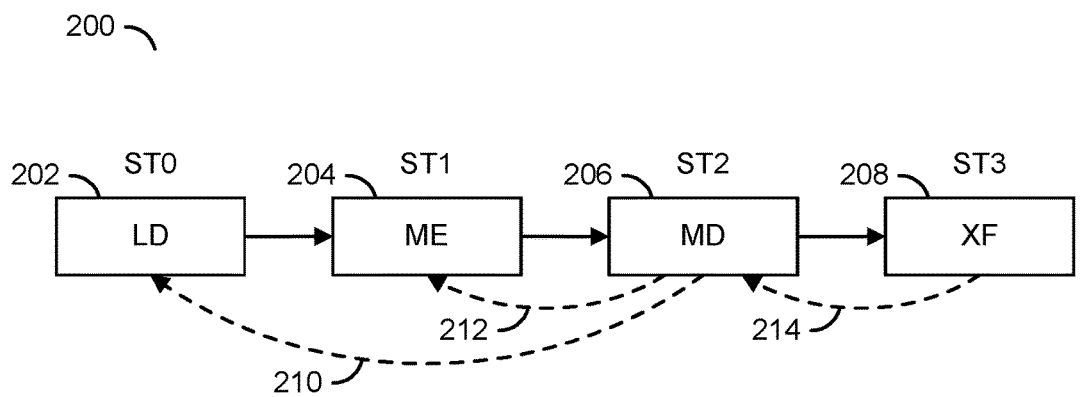
FIG. 3 is a diagram illustrating a hardware pipeline implemented in accordance with an embodiment the present invention.

Referring to FIG. 3, a diagram is shown illustrating an example of a hardware pipeline 200 implemented in accordance with an embodiment of the present invention. In some embodiments, the hardware pipeline 200 comprises four stages 202-208. In various embodiments, the coding tasks are mapped to the four stages as follows. The stage 202 implements a load (LD) stage. The stage 204 implements a motion estimation (ME) stage. the stage 206 implements a mode decision (MD) stage. The stage 208 implements a transform (XF) stage.

High quality encoding is realized by using information from the immediate neighboring blocks (e.g., top and left neighbors) in the various stages. The need for information from the immediate neighboring blocks is met by feedback paths (e.g., represented by dashed arrows) when blocks of the same picture are processed in raster scan order. In the LD stage 202, to guarantee performance, only a limited area for each reference picture is searched. The motion vectors of neighboring blocks are used to perform a guided search that produces better results than an independent search. The guided search creates a dependency 210 on the motion vector selected in the MD stage 206 for the block to the left of the current block. In the ME stage 204, motion estimation considers the cost of encoding the motion vector differential in the bitstream. The motion vector differential depends on the motion vector predictor, which is calculated from the actual motion vectors of the neighboring blocks. This creates a dependency 212 on the motion vector selected in the MD stage 206 for the block to the left of the current block. In the MD stage 206, intra prediction samples are generated by extrapolation from the reconstructed samples of the spatially neighboring blocks. This creates a dependency 214 on the reconstructed samples generated in the XF stage 208 for the block to the left of the current block. Dotted arrows are used to generally indicate data dependencies between various stages when a picture is processed in regular raster scan order. To realize a 4x performance improvement, the hardware needs to be used in a pipelined fashion. The use of the hardware in the pipelined fashion is achieved by breaking the data dependencies (e.g., by processing four pictures in interleaved fashion).

Figure 4:
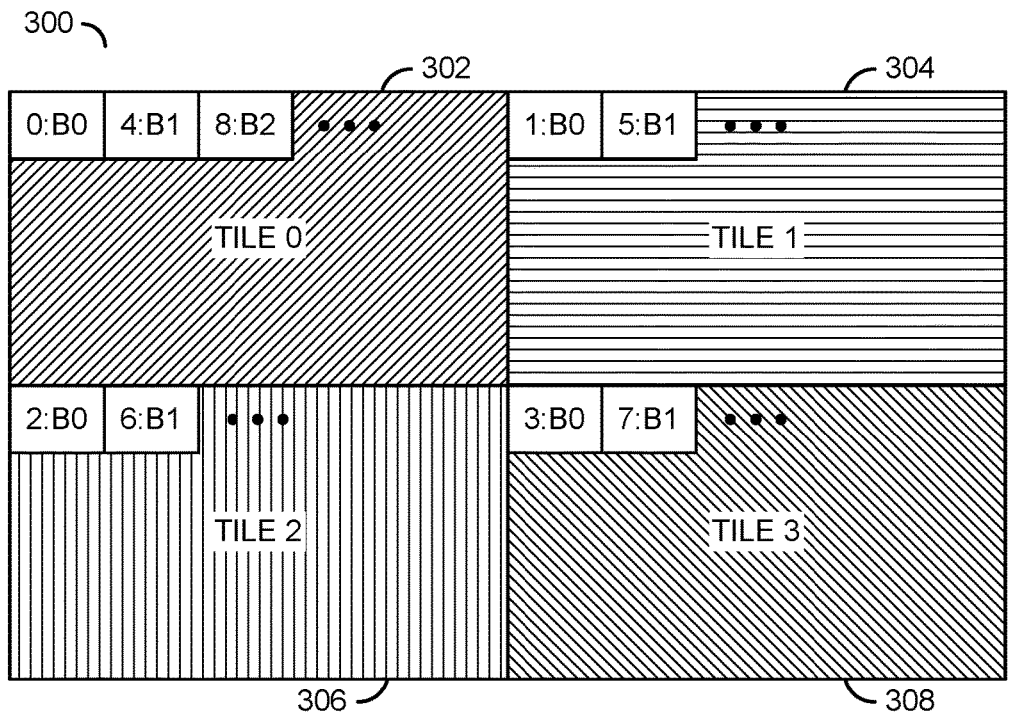
FIG. 4 is a diagram illustrating a picture segmented into four (2×2) tiles and processed at the lowest level with a tile-interleaved block ordering.

Referring to FIG. 4, a diagram is shown illustrating a picture 300 segmented into four (2×2) tiles 302-308. The tiles 302-308 may be numbered in raster scan order (e.g., Tile 0, Tile 1, Tile 2, Tile 3). Within a tile the blocks (e.g., B0, B1, . . . , Bn) are still processed in raster scan order, but at the lowest level the block ordering is tile-interleaved. For example, T0.B0 (block 0 of Tile 0) is processed first, then T1.B0, T2.B0, T3.B0, T0.B1, T1.B1, T2.B1, T3.B1, T0.B2, and so forth. For example, if the picture is split up into 4 tiles (as shown in FIG. 4) and processed using a hardware pipeline with four stages (as shown in FIG. 3), then one block of each tile can be processed in tile-interleaved fashion.

Figure 5:
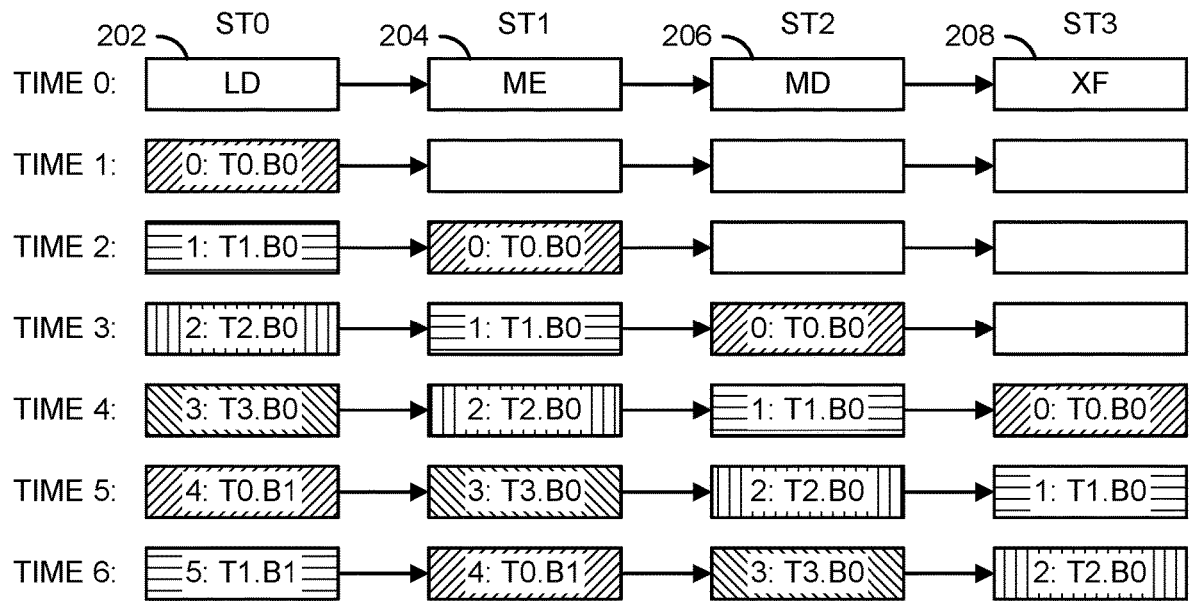
FIG. 5 is a diagram illustrating a pipeline processing order for the 2×2 tiled picture of FIG. 4 using the hardware pipeline of FIG. 3.

Referring to FIG. 5, a diagram is shown illustrating an example pipeline processing order for the 2×2 tiled picture of FIG. 4 using the hardware pipeline 200 of FIG. 3. By the time block T0.B1 enters the hardware pipeline 200, block T0.B0 (the block to the left of T0.B1) has exited the hardware pipeline. Initially (at time 0) all pipeline stages are idle, and processing of block 0 of Tile 0 (e.g., block T0.B0) is about to begin. At time 1, the block T0.B0 is processed in the LD stage 202, and all other stages are still idle. Because there is no data dependency between the blocks of different tiles, block 0 of Tile 1 can be started right away, so at time 2 block T0.B0 is being processed in the ME stage 204 while block T1.B0 is being processed in the LD stage 202. The process of starting blocks in time-interleaved fashion continues, and at time 5 the processing of block T0.B0 is completed—just in time to start processing its immediate neighbor T0.B1.

Figure 6:
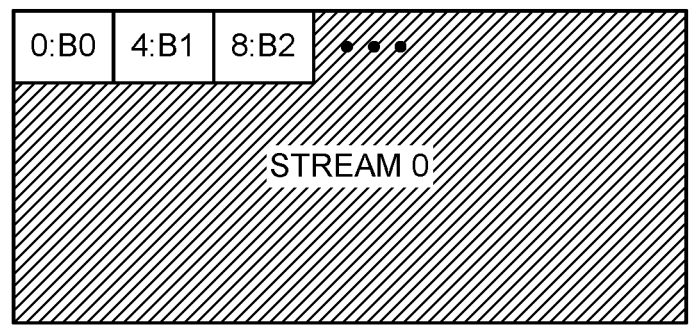
FIG. 6 is a diagram illustrating the parallel processing of four streams in an interleaved fashion.
Figure 6:
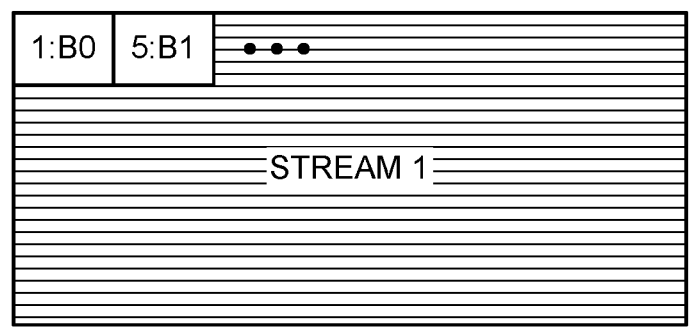
Figure 6:
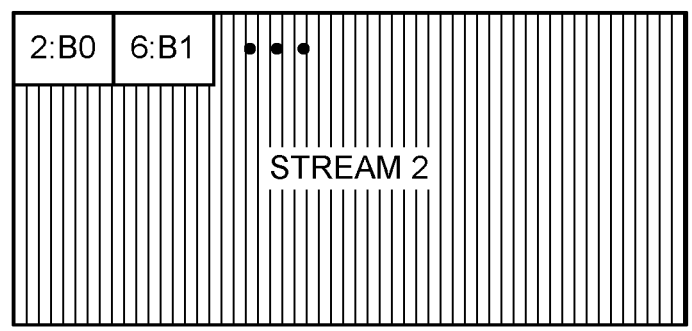
Figure 6:
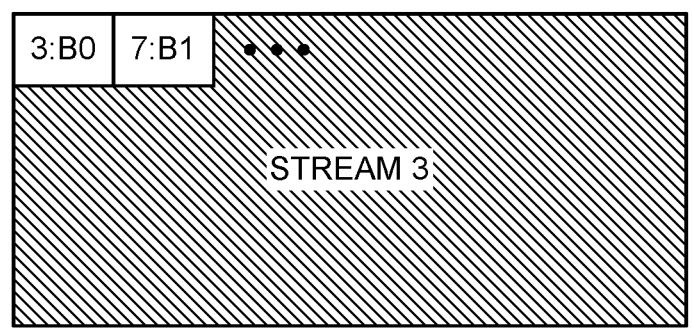

Referring to FIG. 6, a diagram is shown illustrating parallel processing of 4 streams in an interleaved fashion. The tile-interleaving as shown in FIG. 5 is an example of intra-picture interleaving. Performance improvement can be accomplished through parallelism with inter-picture interleaving as well. Within a picture the blocks are still processed in raster scan order, but at the lowest level the block ordering is stream-interleaved. In one example where four streams (e.g., Stream 0, Stream 1, Stream 2, and Stream 3) are processed in pipeline fashion, one block of each stream enters the hardware pipeline in stream-interleaved fashion. The processing order of the various blocks in the hardware pipeline is similar to that of FIGS. 4 and 5, but with 'Tile' replaced by 'Stream'. For example, St0.B0 (block 0 of Stream 0) is processed first, then St1.B0, St2.B0, St3.B0, St0.B1, St1.B1, St2.B1, St3.B1, St0.B2, and so forth.

Figure 7:
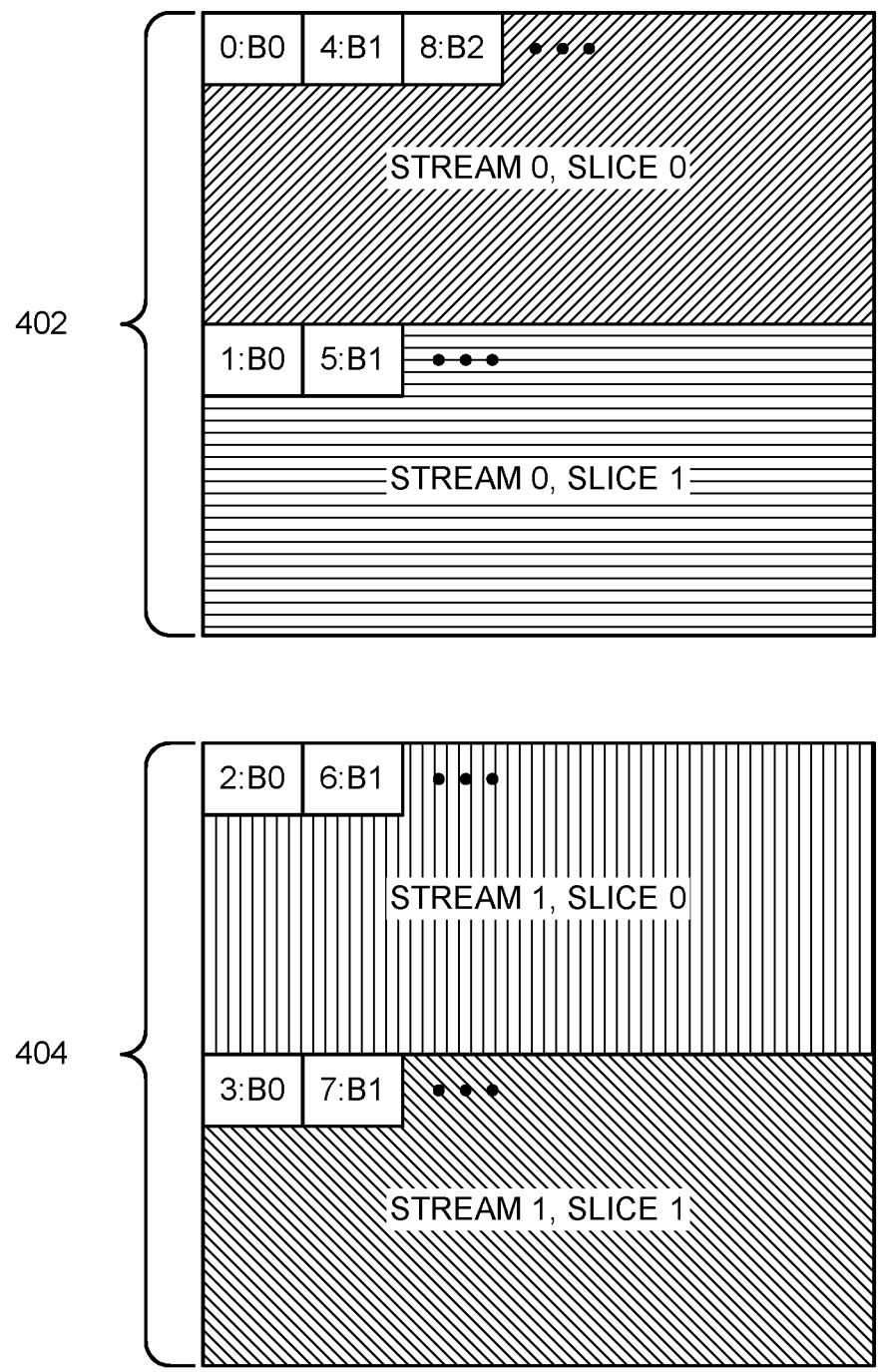
FIG. 7 is a diagram illustrating parallel processing of two streams with pictures segmented into two slices and processed with stream- and slice-interleaved block ordering.

Referring to FIG. 7, a diagram is shown illustrating the parallel processing of two streams with pictures segmented into two slices. In some embodiments, intra- and inter-picture interleaving can be combined. Two streams 402 and 404 may be coded in parallel, and each picture of each stream may be split, for example, into two slices (e.g., Slice 0 and Slice 1). At any point in time four different slices are being coded in the hardware pipeline. Within a slice of each picture the blocks (e.g., B0, B1, ..., Bn) are still processed in raster scan order, but at the lowest level the block ordering is stream- and slice-interleaved. The processing order of the various blocks in the hardware pipeline is again similar to that of FIG. 5, but 'Tile 0' becomes 'Stream 0, Slice 0'; 'Tile 1' becomes 'Stream 0, Slice 1'; 'Tile 2' becomes 'Stream 1, Slice 0'; and 'Tile 3' becomes 'Stream 1, Slice 1'. For example, St0.Sl0.B0 (block 0 of Slice 0 of Stream 0) is processed first, then St0.Sl1.B0, St1.S.0.B0, St1.Sl1.B0, St0.Sl0.B1, St0.Sl1.B1, St1.Sl0.B1, St1.Sl1.B1, St0.Sl0.B2, and so forth.

Figure 8:
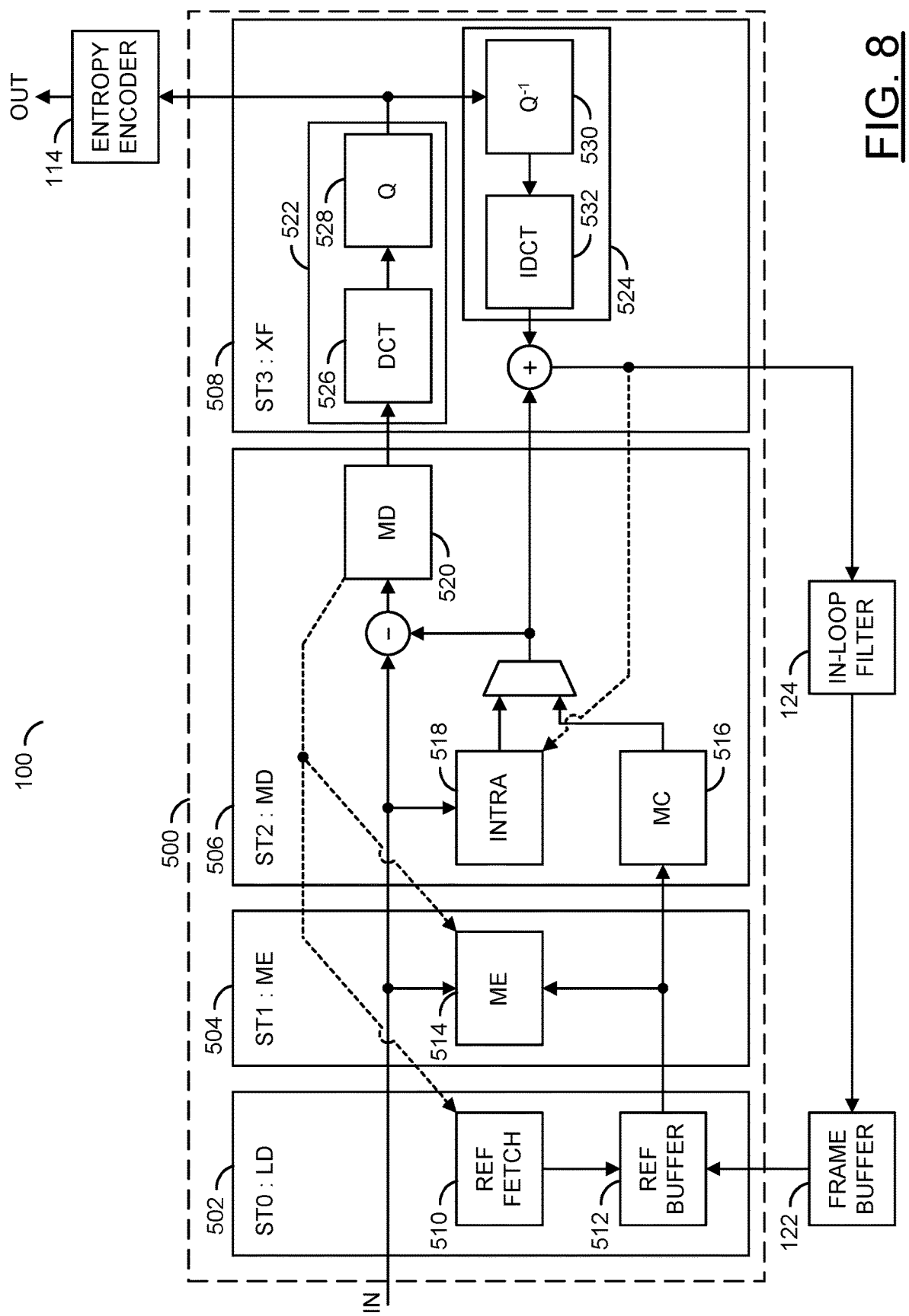
FIG. 8 is a diagram illustrating an example implementation of a hardware pipeline in accordance with an embodiment of the present invention.

Referring to FIG. 8, a diagram is shown illustrating the system 100 of FIG. 1 with an example implementation of a four-stage hardware pipeline 500 in accordance with an embodiment of the invention. In one example, the system 100 may be implemented on an integrated circuit (e.g., a video processing chip, camera chip, etc.). In one example, the hardware pipeline 500 may comprise a stage 502, a stage 504, a stage 506, and a stage 508. However, other numbers of stages may be implemented other embodiments to meet the design criteria of a particular implementation. In one example, the stage 502 comprises a reference fetch unit 510 and a buffer (memory) 512. In general, the reference fetch unit 510 may be configured to fetch only a portion of a full reference frame that is needed by the hardware pipeline 500. The buffer 512 may be configured to operate as a cache memory that allows fast access to fetched reference samples by the other stages of the hardware pipeline 500. In one example, the stage 504 comprises a motion estimation unit 514. In one example, the stage 506 comprises an inter prediction sample generation unit 516, an intra prediction unit 518, and a candidate selection unit 520. In one example, the stage 508 comprises a forward path unit 522 and an inverse path unit 524. In various embodiments, the forward path unit 522 comprises a transform unit 526 and a quantization unit 528. In some embodiments, the transform unit 526 is configured to perform a discrete cosine transform (DCT). However, other transformation operations may be implemented to meet the design criteria of a particular implementation. In various embodiments, the inverse path unit 524 comprises an inverse quantization unit 530 and an inverse transform unit 532. The inverse transform unit 532 is generally configured to perform an inverse operation relative to the transform unit 526 (e.g., an inverse discrete cosine transform (IDCT), etc.). The operations performed by the individual hardware units implemented in each of the stages of the hardware pipeline 500 generally implement the encoding steps typical of the particular compression scheme(s) to be performed. The stages of the hardware pipeline 500 (e.g., stages 502-508) may comprise additional circuitry for operatively coupling the stages to one another. Feedback paths between the stages 502-508 (e.g., represented by dashed arrows) generally facilitate the communication of predictor information that is based on actual neighbor data rather than based on estimated neighbor data from later stages to earlier stages of the hardware pipeline 500.

Implementation of a video coding system with tasks mapped to a hardware pipeline in accordance with an embodiment of the present invention allows significantly higher performance video coding without significant increase in hardware area. The video coding uses predictor information that is based on actual neighbor data which yields much higher quality than when predictor information is based on estimated neighbor data. Therefore, the increase in performance does not come at the expense of a reduction in quality.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory configured to store video data, wherein said video data comprises pictures of a plurality of streams that can be processed independently; and
an integrated circuit comprising a hardware pipeline comprising a plurality of pipeline stages implementing a video coding process comprising a number of steps, wherein each of said plurality of pipeline stages performs an associated task of a different step of said video coding process in a substantially similar time on a block of a picture from a different one of said plurality of streams, such that block ordering is stream-interleaved as each of said plurality of streams pass through each of said pipeline stages and at least one of said plurality of pipeline stages communicates predictor information that is based on actual neighbor data to an earlier stage of the hardware pipeline.

2. The apparatus according to claim 1, wherein said hardware pipeline implements one or more of a load function, a motion estimation function, a mode decision function, and a transform function.

3. The apparatus according to claim 2, wherein:
said load function is implemented with a reference fetch unit and buffer;
said mode decision function is implemented with an inter prediction sample generation unit, an intra prediction unit, and a candidate selection unit; and
said transform function is implemented with a forward path unit and an inverse path unit.

4. The apparatus according to claim 1, wherein said memory is implemented on the integrated circuit comprising said hardware pipeline.

5. The apparatus according to claim 1, wherein said memory and said hardware pipeline are implemented on a camera chip.

6. The apparatus according to claim 1, wherein said memory and said hardware pipeline are part of a video encoder.

7. The apparatus according to claim 1, wherein each of said plurality of pipeline stages is implemented as a separate dedicated hardware unit.

8. The apparatus according to claim 1, wherein said plurality of streams avoid data dependencies among blocks being processed in parallel.

9. The apparatus according to claim 1, wherein data dependencies between neighboring blocks are broken by processing said plurality of streams in said plurality of pipeline stages in said stream-interleaved fashion.

10. A method of encoding video comprising:
retrieving video data from a memory, wherein said video data comprises pictures of a plurality of streams that can be processed independently; and
performing a number of steps of a video coding process using a hardware pipeline comprising a plurality of pipeline stages, wherein said hardware pipeline is implemented in an integrated circuit, each of said plurality of pipeline stages performs an associated task of a different step of said video coding process in a substantially similar time on a block of a picture from a different one of said plurality of streams, such that block ordering is stream-interleaved as each of said plurality of streams pass through each of said pipeline stages, and at least one of said plurality of pipeline stages communicates predictor information that is based on actual neighbor data to an earlier stage of the hardware pipeline.

11. The method according to claim 10, wherein said hardware pipeline implements a load function, a motion estimation function, a mode decision function, and a transform function.

12. The method according to claim 11, wherein:
said load function is performed using a reference fetch unit and a buffer;
said mode decision function is performed using an inter prediction sample generation unit, an intra prediction unit, and a candidate selection unit; and
said transform function is performed using a forward path unit and an inverse path unit.

13. The method according to claim 10, wherein said plurality of streams avoid data dependencies among sections being processed in parallel.

14. The method according to claim 10, wherein a block ordering of processing performed in the plurality of pipeline stages comprises at least one of stream-interleaved and stream- and slice-interleaved.

15. The method according to claim 10, further comprising storing reconstructed samples presented at an output of said hardware pipeline in a frame buffer.

16. The method according to claim 10, further comprising performing entropy encoding on samples presented at an output of said hardware pipeline.

17. The method according to claim 10, wherein each of said plurality of pipeline stages is implemented as a separate dedicated hardware unit.

18. The method according to claim 10, wherein data dependencies between neighboring blocks are broken by processing said plurality of streams in said plurality of pipeline stages in said stream-interleaved fashion.

* * * * *